United States Patent
Larlus et al.

(10) Patent No.: US 11,734,352 B2
(45) Date of Patent: Aug. 22, 2023

(54) CROSS-MODAL SEARCH SYSTEMS AND METHODS

(71) Applicant: NAVER CORPORATION, Gyeonggi-do (KR)

(72) Inventors: Diane Larlus, La Tronche (FR); Jon Almazan, London (GB); Cesar De Souza, Grenoble (FR); Naila Murray, Grenoble (FR); Rafael Sampaio De Rezende, Grenoble (FR)

(73) Assignee: NAVER CORPORATION, Gyeonggi-do (KR)

( * ) Notice: Subject to any disclaimer, the term of this patent is extended or adjusted under 35 U.S.C. 154(b) by 649 days.

(21) Appl. No.: 16/791,368

(22) Filed: Feb. 14, 2020

(65) Prior Publication Data
US 2021/0256068 A1    Aug. 19, 2021

(51) Int. Cl.
| | | |
|---|---|---|
| *G06F 16/9032* | (2019.01) | |
| *G06F 16/9038* | (2019.01) | |
| *G06F 17/16* | (2006.01) | |
| *G06F 18/22* | (2023.01) | |
| *G06F 18/214* | (2023.01) | |
| *G06V 10/74* | (2022.01) | |

(Continued)

(52) U.S. Cl.
CPC ...... *G06F 16/9032* (2019.01); *G06F 16/9038* (2019.01); *G06F 16/90332* (2019.01); *G06F 17/16* (2013.01); *G06F 18/2148* (2023.01); *G06F 18/22* (2023.01); *G06V 10/761* (2022.01); *G06V 10/764* (2022.01); *G06V 10/82* (2022.01)

(58) Field of Classification Search
CPC .. G06K 9/6272; G06K 9/6257; G06K 9/6215; G06F 16/907; G06F 16/9032; G06F 16/90332; G06F 16/9038; G06F 17/16; G06F 18/22; G06F 18/2148; G06V 10/82; G06V 10/761; G06V 10/764
See application file for complete search history.

(56) References Cited

U.S. PATENT DOCUMENTS

2020/0097604 A1*    3/2020   Lee ..................... G06N 3/0445

OTHER PUBLICATIONS

Luo, Minnan, et al. "Simple to complex cross-modal learning to rank." Computer Vision and Image Understanding 163 (2017): 67-77. (Year: 2017).*

(Continued)

*Primary Examiner* — Vu Le
*Assistant Examiner* — Tracy Mangialaschi

(57) ABSTRACT

A training system includes: a training dataset including first objects of a first modality and second objects of a second modality that are associated with the first objects, respectively; a first matrix including first relevance values indicative of relevance between the first objects and the second objects, respectively; a second matrix including second relevance values indicative of relevance between the second objects and the first objects, respectively; and a training module configured to: based on similarities between ones of the second objects, generate a third matrix by selectively adding first additional relevance values to the first matrix; based on the similarities between the ones of the second objects, generate a fourth matrix by selectively adding second additional relevance values to the second matrix; and store the third and fourth matrices in memory of a search module for cross-modal retrieval in response to receipt of search queries.

15 Claims, 7 Drawing Sheets

(51) Int. Cl.
G06V 10/764 (2022.01)
G06V 10/82 (2022.01)

(56) References Cited

OTHER PUBLICATIONS

Wang, Liwei, Yin Li, and Svetlana Lazebnik. "Learning Deep Structure-Preserving Image-Text Embeddings." 2016 IEEE Conference on Computer Vision and Pattern Recognition (CVPR). IEEE, 2016. (Year: 2016).*
Jiang, Lu, et al. "Self-paced learning with diversity." Advances in neural information processing systems 27 (2014). (Year: 2014).*
Wu, Fei, et al. "Cross-media semantic representation via bi-directional learning to rank." Proceedings of the 21st ACM international conference on Multimedia. 2013. (Year: 2013).*
Hua, Yan, et al. "Cross-modal correlation learning by adaptive hierarchical semantic aggregation." IEEE Transactions on Multimedia 18.6 (2016): 1201-1216. (Year: 2016).*
Devlin, Jacob, Ming-Wei Chang, Kenton Lee, and Kristina Toutanova. 'BERT: Pre-Training of Deep Bidirectional Transformers for Language Understanding'. ArXiv:1810.04805 [Cs], May 24, 2019. http://arxiv.org/abs/1810.04805.
Gong, Yunchao, Qifa Ke, Michael Isard, and Svetlana Lazebnik. 'A Multi-View Embedding Space for Modeling Internet Images, Tags, and Their Semantics'. International Journal of Computer Vision 106, No. 2 (Jan. 2014): 210-33. https://doi.org/10.1007/s11263-013-0658-4.
Gordo, Albert, and Diane Larius. 'Beyond Instance-Level Image Retrieval: Leveraging Captions to Learn a Global Visual Representation for Semantic Retrieval'. In 2017 IEEE Conference on Computer Vision and Pattern Recognition (CVPR), 5272-81. Honolulu, HI: IEEE, 2017. https://doi.org/10.1109/CVPR.2017.560.
Gordo, Albert, Jon Almazan, Jerome Revaud, and Diane Larlus. 'Deep Image Retrieval: Learning Global Representations for Image Search'. ArXiv:1604.01325 [Cs], Jul. 28, 2016. http://arxiv.org/abs/1604.01325.
Gordo, Albert, Jon Almazan, Jerome Revaud, and Diane Larlus. 'End-to-End Learning of Deep Visual Representations for Image Retrieval'. ArXiv:1610.07940 [Cs], May 5, 2017. http://arxiv.org/abs/1610.07940.
Han, Xintong, Zuxuan Wu, Phoenix X. Huang, Xiao Zhang, Menglong Zhu, Yuan Li, Yang Zhao, and Larry S. Davis. 'Automatic Spatially-Aware Fashion Concept Discovery'. ArXiv:1708.01311 [Cs], Aug. 3, 2017. http://arxiv.org/abs/1708.01311.
Karpathy, Andrej, and Li Fei-Fei. 'Deep Visual-Semantic Alignments for Generating Image Descriptions'. In 2015 IEEE Conference on Computer Vision and Pattern Recognition (CVPR), 3128-37, 2015. https://doi.org/10.1109/CVPR.2015.7298932.
Kim, Sungyeon, Minkyo Seo, Ivan Laptev, Minsu Cho, and Suha Kwak. 'Deep Metric Learning Beyond Binary Supervision'. ArXiv:1904.09626 [Cs], Apr. 21, 2019. http://arxiv.org/abs/1904.09626.
Klein, Benjamin, Guy Lev, Gil Sadeh, and Lior Wolf. 'Associating Neural Word Embeddings with Deep Image Representations Using Fisher Vectors'. In 2015 IEEE Conference on Computer Vision and Pattern Recognition (CVPR), 4437-46. Boston, MA, USA: IEEE, 2015. https://doi.org/10.1109/CVPR.2015.7299073.
Krishna, Ranjay, Yuke Zhu, Oliver Groth, Justin Johnson, Kenji Hata, Joshua Kravitz, Stephanie Chen, et al. 'Visual Genome: Connecting Language and Vision Using Crowdsourced Dense Image Annotations'. International Journal of Computer Vision 123, No. 1 (May 2017): 32-73. https://doi.org/10.1007/s11263-016-0981-7.

Lin, Tsung-Yi, Michael Maire, Serge Belongie, James Hays, Pietro Perona, Deva Ramanan, Piotr Dollár, and C. Lawrence Zitnick. 'Microsoft COCO: Common Objects in Context'. In Computer Vision—ECCV 2014, edited by David Fleet, Tomas Pajdla, Bernt Schiele, and Tinne Tuytelaars, 8693:740-55. Cham: Springer International Publishing, 2014. https://doi.org/10.1007/978-3-319-10602-1_48.
Liu, Tie-Yan. 'Learning to Rank for Information Retrieval'. Foundations and Trends® in information Retrieval 3, No. 3 (2007): 225-331. https://doi.org/10.1561/1500000016.
Plummer, Bryan A., Liwei Wang, Chris M. Cervantes, Juan C. Caicedo, Julia Hockenmaier, and Svetlana Lazebnik. 'Flickr30k Entities: Collecting Region-to-Phrase Correspondences for Richer Image-to-Sentence Models'. In 2015 IEEE International Conference on Computer Vision (ICCV), 2641-49, 2015. https://doi.org/10.1109/ICCV.2015.303.
Rezende, R., Larius, D., Almazan, J., De Souza, C., and Murray, N. "Global Ranking Loss with Continuous Annotations for Cross-Modal Retrieval", May 14, 2019.
Schroff, Florian, Dmitry Kalenichenko, and James Philbin. 'FaceNet: A Unified Embedding for Face Recognition and Clustering'. In 2015 IEEE Conference on Computer Vision and Pattern Recognition (CVPR), 815-23, 2015. https://doi.org/10.1109/CVPR.2015.7298682.
Socher, Richard, Andrej Karpathy, Quoc V. Le, Christopher D. Manning, and Andrew Y. Ng. 'Grounded Compositional Semantics for Finding and Describing Images with Sentences'. Transactions of the Association for Computational Linguistics 2 (Dec. 2014): 207-18. https://doi.org/10.1162/tacl_a_00177.
Wang, Liwei, Yin Li, and Svetlana Lazebnik. 'Learning Deep Structure-Preserving Image-Text Embeddings'. ArXiv:1511.06078 [Cs], Apr. 13, 2016. http://arxiv.org/abs/1511.06078.
Young, Peter, Alice Lai, Micah Hodosh, and Julia Hockenmaier. 'From Image Descriptions to Visual Denotations: New Similarity Metrics for Semantic Inference over Event Descriptions'. Transactions of the Association for Computational Linguistics 2 (Dec. 2014): 67-78. https://doi.org/10.1162/tacl_a_00166.
Kun He, Fatih Cakir, Sarah Adel Bargal, and Stan Sclaroff. Hashing as tie-aware learning to rank. In CVPR, 2018.
Kun He, Yan Lu, and Stan Sclaroff. Local descriptors optimized for average precision. In CVPR, 2018.
Liwei Wang, Yin Li, Jing Huang, and Svetlana Lazebnik. Learning two-branch neural networks for image-text matching tasks. PAMI, 41(2):394-407, 2018.
Frome, Andrea, Greg S Corrado, Jon Shlens, Samy Bengio, Jeff Dean, Marc'Aurelio Ranzato, and Tomas Mikolov. 'DeViSE: A Deep Visual-Semantic Embedding Model', n.d., 9. NIPS 2013.
Larlus, D, R Rezende, J Almazan, C de Souza, and N Murray. 'Self-Enriching Annotations for Learning to Rank in the Context of Cross-Modal Search', n.d., 9. May 14, 2019.
Revaud, Jerome, Jon Almazan, and Rafael S Rezende. 'Learning With Average Precision: Training Image Retrieval With a Listwise Loss', n.d., 10. Jun. 18, 2019.
Ustinova, Evgeniya, and Victor Lempitsky. 'Learning Deep Embeddings with Histogram Loss', n.d., 9. Nov. 2, 2016.
Valizadegan, Hamed, Rong Jin, Ruofei Zhang, and Jianchang Mao. 'Learning to Rank by Optimizing NDCG Measure', n.d., 9. Jan. 2009.
Weston, Jason, Samy Bengio, and Nicolas Usunier. 'WSABIE: Scaling Up to Large Vocabulary Image Annotation', n.d., 7. Jul. 16, 2011.

* cited by examiner

Image 1: A child in orange shirt is pouring Legos out of a plastic bag

Image 2: A child is playing with a Lego toy.

Image 3: A small dog jumping some hurdles.

CROSS-MODAL SEARCH SYSTEMS AND METHODS

FIELD

The present disclosure relates to search systems and methods and more particularly to systems and methods for training cross-modal search systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Use of computers, smartphones, and other Internet-connected devices has grown exponentially. Users utilize Internet-connected devices for many different tasks. For example, a user may utilize an Internet-connected device to search for local businesses, such as restaurants. As another example, a user may utilize an Internet-connected device to obtain directions to navigate to a desired location. As yet another example, a user may utilize an Internet-connected device to perform one or more building related functions, such as turn on a light within a building, adjust heating or cooling of a building, or open or close a garage door. As yet another example, a user may utilize an Internet-connected device to search for information on a topic, place an order, etc.

SUMMARY

In a feature, a system for training a cross-modal search system includes: a training dataset including first objects of a first modality and second objects of a second modality that are associated with the first objects, respectively, where the first modality is different than the second modality, and where the second objects include text that is descriptive of the first objects; a first matrix including first relevance values indicative of relevance between the first objects and the second objects, respectively; a second matrix including second relevance values indicative of relevance between the second objects and the first objects, respectively; and a training module configured to: based on similarities between ones of the second objects, generate a third matrix by selectively adding first additional relevance values to the first matrix; based on the similarities between the ones of the second objects, generate a fourth matrix by selectively adding second additional relevance values to the second matrix; and store the third and fourth matrices in memory of a search module for cross-modal retrieval in response to receipt of search queries.

In further features the system further includes: a fifth matrix including third relevance values indicative of relevance between the first objects and the first objects, respectively; and a sixth matrix including fourth relevance values indicative of relevance between the second objects and the second objects, respectively.

In further features, the training module is further configured to: based on the similarities between the ones of the second objects, generate a seventh matrix by selectively adding third additional relevance values to the fifth matrix; based on the similarities between the ones of the second objects, generate an eight matrix by selectively adding fourth additional relevance values to the sixth matrix; and store the seventh and eighth matrices in the memory of the search module for the cross-modal retrieval in response to receipt of search queries.

In further features, the training module is configured to add a first relevance value to the first matrix when a first similarity value representative of a similarity between a first one of the second objects and a second one of the second objects is greater than a predetermined threshold value.

In further features, the training module is configured to add a second relevance value to the second matrix when a second similarity value representative of a second similarity between a third one of the second objects and a fourth one of the second objects is greater than the predetermined threshold value.

In further features, the first objects are one of images, sounds, and videos.

In further features, the training module is configured to: determine listwise losses based on the training dataset and using the third and fourth matrices; train first and second functions for cross-modal retrieval based on the listwise losses; and store the first and second functions in the memory of the search module.

In further features, the training module is configured to: determine triplet losses based on triplets of the training dataset and using the third and fourth matrices; train first and second functions for cross-modal retrieval based on the triplet losses; and store the first and second functions in the memory of the search module.

In further features, the training module is configured to: determine the quantized mean average precision (mAP) losses based on the training dataset and using the third and fourth matrices; train first and second functions for cross-modal retrieval based on the quantized mAP losses; and store the first and second functions in the memory of the search module.

In further features, the training module is configured to: determine the quantized normalized discounted cumulative gain (NDCG) losses based on the training dataset and using the third and fourth matrices; train first and second functions for cross-modal retrieval based on the quantized NDCG losses; and store the first and second functions in the memory of the search module.

In further features, the third and fourth matrices include values selected from a group consisting of 0 and 1.

In further features, the third and fourth matrices include values selected from a group consisting of 0, 1, and values between 0 and 1.

In a feature, a method for cross-modal search includes: receiving, at a search module, a first search query in a first modality; accessing a third matrix and fourth matrix in memory of the search module in response to the first search query; encoding the first search query using a first function including the third and fourth matrices; identifying at least one search result for the first search query based on a result of the encoding using the first function; and transmitting the at least one search result from the search module; where the third and fourth matrices are generated by: accessing a training dataset including first objects of the first modality and second objects of a second modality that are associated with the first objects, respectively, the first modality being different than the second modality, and the second objects including text that is descriptive of the first objects; obtaining a first matrix including first relevance values indicative of relevance between the first objects and the second objects, respectively; obtaining a second matrix including second relevance values indicative of relevance between the second objects and the first objects, respectively; based on similarities between ones of the second objects, generating the third matrix by selectively adding first additional relevance values to the first matrix; and based on the similarities between the ones of the second objects, generating the fourth matrix by selectively adding second additional relevance values to the second matrix.

In further features, the method further includes, by the search module: receiving a second search query in the second modality; encoding the second search query using a second function including the third and fourth matrices; and identifying at least one search result for the second search query based on a result of the encoding using the second function.

In further features, the method further includes: receiving the first search query from a user device over a network; and transmitting the at least one search result for the first search query to the user device over the network.

In a feature, a system for training a cross-modal search system includes: a training dataset including first objects of a first modality and second objects of a second modality that are associated with the first objects, respectively, where the first modality is different than the second modality, and where the second objects include text that is descriptive of the first objects; a first matrix including first relevance values indicative of relevance between the first objects and the second objects, respectively; a second matrix including second relevance values indicative of relevance between the second objects and the first objects, respectively; and a training module configured to: split an embedding space into a plurality of bins, each of the bins corresponding to a predetermined range of distances from a query; assign ones of the second objects to ones of the bins based on distances between the second ones of the objects and a query; determine a ranking measure based on a number of the ones of the second objects assigned to the second objects assigned to the bins; determine losses based on the ranking measure and the first and second matrices; determine a final loss based on the losses; train embedding functions based on the final loss; and store the embedding functions in memory of a search module for cross-modal retrieval in response to receipt of search queries.

In further features, the training module is configured to assign ones of the second objects to ones of the bins using a kernel function.

In further features, the kernel function is a triangular kernel function.

In further features, the ranking measure includes a quantized mean average precision (mAP).

In further features, the ranking measure includes a quantized normalized discounted cumulative gain (NDCG).

In further features, the first objects are one of images, sounds and videos.

In a feature, a method for cross-modal search includes: receiving, at a search module, a first search query in a first modality; accessing embedding functions in memory of the search module in response to receipt of the first search query; encoding the first search query using a first one of the embedding functions; identifying at least one search result for the first search query based on a result of the encoding using the first one of the embedding functions; and transmitting the at least one search result from the search module; where the embedding functions are trained by: accessing a training dataset including first objects of a first modality and second objects of a second modality that are associated with the first objects, respectively, the first modality being different than the second modality, and the second objects including text that is descriptive of the first objects; obtaining a first matrix including first relevance values indicative of relevance between the first objects and the second objects, respectively; obtaining a second matrix including second relevance values indicative of relevance between the second objects and the first objects, respectively; splitting an embedding space into a plurality of bins, each of the bins corresponding to a predetermined range of distances from a query; assigning ones of the second objects to ones of the bins based on distances between the second ones of the objects and a query; determining a ranking measure based on a number of the ones of the second objects assigned to the bins; determining losses based on the ranking measure and the first and second matrices; determining a final loss based on the losses; and training the embedding functions based on the final loss.

In further features, the method further includes, by the search module: receiving a second search query in the second modality; encoding the second search query using a second one of the embedding functions; and identifying at least one search result for the second search query based on a result of the encoding using the second one of the embedding functions.

In further features, the method further includes: receiving the first search query from a user device over a network; and transmitting the at least one search result for the first search query to the user device over the network.

In a feature, a cross-modal search system includes: a memory for storing a third matrix and a fourth matrix; a search module for receiving a first search query in a first modality; wherein the search module accesses the third matrix and the fourth matrix in the memory in response to the first search query, encodes the first search query using a first function including the third and fourth matrices; and identifies at least one search result for the first search query based on a result of the encoding using the first function; and transmits the at least one search result; where said cross-modal search system is trained using: a training dataset including first objects of the first modality and second objects of a second modality that are associated with the first objects, respectively, wherein the first modality is different than the second modality, and wherein the second objects include text that is descriptive of the first objects; a first matrix including first relevance values indicative of relevance between the first objects and the second objects, respectively; a second matrix including second relevance values indicative of relevance between the second objects and the first objects, respectively; and a training module configured to: based on similarities between ones of the second objects, generate the third matrix by selectively adding first additional relevance values to the first matrix; and based on the similarities between the ones of the second objects, generate the fourth matrix by selectively adding second additional relevance values to the second matrix.

In a feature, a method for training a cross-modal search system includes: accessing a training dataset including first objects of a first modality and second objects of a second modality that are associated with the first objects, respectively, where the first modality is different than the second modality, and where the second objects include text that is descriptive of the first objects; obtaining a first matrix including first relevance values indicative of relevance between the first objects and the second objects, respectively; obtaining a second matrix including second relevance values indicative of relevance between the second objects and the first objects, respectively; based on similarities between ones of the second objects, generating a third matrix by selectively adding first additional relevance values to the first matrix; based on the similarities between the ones of the second objects, generating a fourth matrix by selectively adding second additional relevance values to the second matrix; and storing the third and fourth matrices in memory of a search module for cross-modal retrieval in response to receipt of search queries.

In a feature, a cross-modal search system includes: a memory for storing embedding functions; a search module for receiving a first search query in a first modality; wherein the search module accesses the embedding functions in the memory in response to receipt of the first search query, encodes the first search query using a first one of the embedding functions; identifies at least one search result for the first search query based on a result of the encoding using the first one of the embedding functions; and transmits the at least one search result; where said cross-modal search system is trained using: a training dataset including first objects of the first modality and second objects of a second modality that are associated with the first objects, respectively, wherein the first modality is different than the second modality, and wherein the second objects include text that is descriptive of the first objects; a first matrix including first relevance values indicative of relevance between the first objects and the second objects, respectively; a second matrix including second relevance values indicative of relevance between the second objects and the first objects, respectively; and a training module configured to: split an embedding space into a plurality of bins, each of the bins corresponding to a predetermined range of distances from a query; assign ones of the second objects to ones of the bins based on distances between the second ones of the objects and a query; determine a ranking measure based on a number of the ones of the second objects assigned to the bins; determine losses based on the ranking measure and the first and second matrices; determine a final loss based on the losses; and train the embedding functions based on the final loss.

In a feature, a method for training a cross-modal search system includes: accessing a training dataset including first objects of a first modality and second objects of a second modality that are associated with the first objects, respectively, where the first modality is different than the second modality, and where the second objects include text that is descriptive of the first objects; obtaining a first matrix including first relevance values indicative of relevance between the first objects and the second objects, respectively; obtaining a second matrix including second relevance values indicative of relevance between the second objects and the first objects, respectively; splitting an embedding space into a plurality of bins, each of the bins corresponding to a predetermined range of distances from a query; assigning ones of the second objects to ones of the bins based on distances between the second ones of the objects and a query; determining a ranking measure based on a number of the ones of the second objects assigned to the bins; determining losses based on the ranking measure and the first and second matrices; determining a final loss based on the losses; training embedding functions based on the final loss; and storing the embedding functions in memory for cross-modal retrieval in response to receipt of search queries.

In a feature, a system for training a cross-modal search system includes: a training dataset including first objects of a first modality and second objects of a second modality that are associated with the first objects, respectively, where the first modality is different than the second modality, and where the second objects include text that is descriptive of the first objects; a first matrix including first relevance values indicative of relevance between the first objects and the second objects, respectively; a second matrix including second relevance values indicative of relevance between the second objects and the first objects, respectively; and a means for: based on similarities between ones of the second objects, generating a third matrix by selectively adding first additional relevance values to the first matrix; based on the similarities between the ones of the second objects, generating a fourth matrix by selectively adding second additional relevance values to the second matrix; and storing the third and fourth matrices in memory for cross-modal retrieval in response to receipt of search queries.

In a feature, a system for training a cross-modal search system includes: a training dataset including first objects of a first modality and second objects of a second modality that are associated with the first objects, respectively, where the first modality is different than the second modality, and where the second objects include text that is descriptive of the first objects; a first matrix including first relevance values indicative of relevance between the first objects and the second objects, respectively; a second matrix including second relevance values indicative of relevance between the second objects and the first objects, respectively; a means for: splitting an embedding space into a plurality of bins, each of the bins corresponding to a predetermined range of distances from a query; assigning ones of the second objects to ones of the bins based on distances between the second ones of the objects and a query; determining a ranking measure based on a number of the ones of the second objects assigned to the bins; determining losses based on the ranking measure and the first and second matrices; determining a final loss based on the losses; training embedding functions based on the final loss; and storing the embedding functions in memory of a search module for cross-modal retrieval in response to receipt of search queries.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Cross-modal search involves receiving search queries in one modality regarding obtaining search results in another modality. For example, one type of cross-modal search involves receiving search queries including text regarding obtaining images that are most closely related to the text. Another type of cross-modal search involves receiving images and providing search results including text that is most closely related to the image.

The present disclosure involves extending relevance matrices used to train embedding functions based on similarities between text captions that are descriptive of associated items of a second modality, such as images. By extending the relevance matrices, the similar items of the second modality will be more closely related than items of the second modality that are different. This improves search results relative to use of relevance matrices that more simply indicate that the text caption associated with an item of the second modality (e.g., an image) is related to that item and not related to any other item of the second modality.

The embedding functions are used by a search system to encode a search query received in a first modality (e.g., an image) to determine search results in a second modality (e.g., text descriptive of the image). Triplet losses can be used to train the embedding functions. Alternatively, listwise losses can be used to train the embedding functions. Listwise losses may simplify the training in that a larger batch of training data may be used at the same time for the training, and the process of identifying triplets for the training (using triplet losses) can be avoided. Alternatively, quantized mean average precision (mAPQ) or quantized normalized discounted cumulative gain (NDCGQ) can be used to train the embedding functions.

Figure 1:
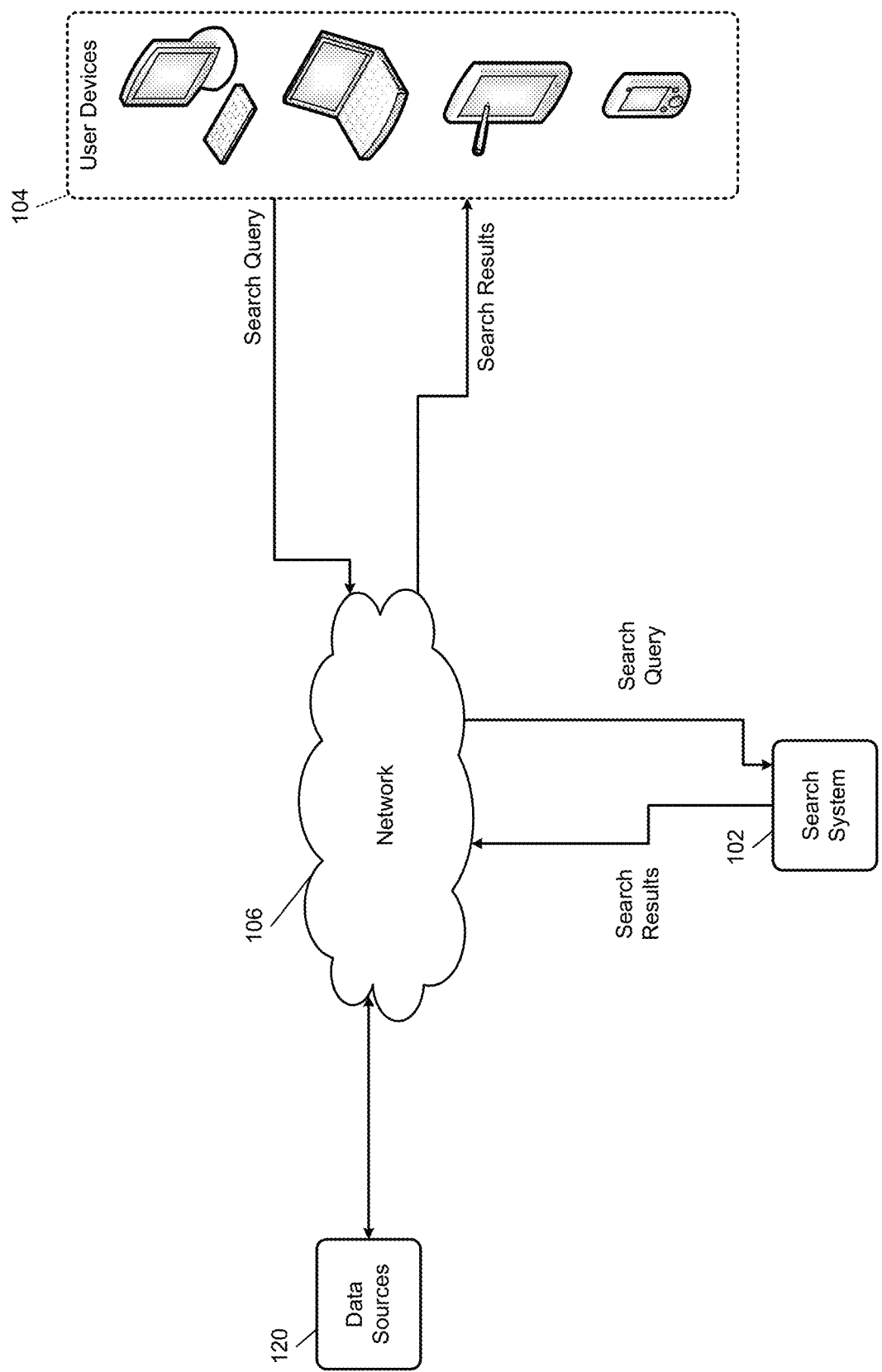
FIG. 1 includes a functional block diagram of an example environment including a search system configured to provide search results in response to queries.

FIG. 1 includes a functional block diagram including a cross-modal search system 102 configured to respond to queries. The search system 102 is configured to receive queries in a first modality from one or more user computing device(s) 104 via a network 106. The search system 102 performs searches in a second modality based on the queries, respectively, to identify one or more search results in the second modality. For example, the first modality may be text and the second modality may be images. As another example, the first modality may be images and the second modality may be text. The search system 102 transmits the search results back to the user devices 104 that transmitted the queries, respectively.

The user devices 104 may display the search results to users. The user devices 104 may also display other information to the users. For example, the user devices 104 may display additional information related to the search results, advertisements related to the search results, and/or other information. The search system 102 and the user devices 104 communicate via a network 106.

A plurality of different types of user devices 104 are illustrated in FIG. 1. An individual user computing device may also be referred to herein as a user device 104. The user devices 104 include any type of computing devices that is configured to generate and transmit search queries to the search system 102 via the network 106. Examples of the user devices 104 include, but are not limited to, smart (cellular) phones, tablet computers, laptop computers, and desktop computers, as illustrated in FIG. 1. The user devices 104 may also include other computing devices having other form factors, such as computing devices included in vehicles, gaming devices, televisions, consoles (e.g., smart speakers without displays Amazon Echo, Google Home, Clova Friends mini) or other appliances (e.g., networked refrigerators, networked thermostats, etc.). In various implementations, the search system 102 may be implemented within a device, such as a navigating robot or vehicle, as discussed further below.

The user devices 104 may use a variety of different operating systems. In an example where a user device 104 is a mobile device, the user device 104 may run an operating system including, but not limited to, Android, iOS developed by Apple Inc., or Windows Phone developed by Microsoft Corporation. In an example where a user device 104 is a laptop or desktop device, the user device 104 may run an operating system including, but not limited to, Microsoft Windows, Mac OS, or Linux. The user devices 104 may also access the search system 102 while running operating systems other than those operating systems described above, whether presently available or developed in the future.

In some examples, a user device 104 may communicate with the search system 102 using an application installed on the user device 104. In general, a user device 104 may communicate with the search system 102 using any application that can transmit queries to the search system 102 to be responded to (with search results) by the search system 102. In some examples, a user device 104 may run an application that is dedicated to interfacing with the search system 102, such as an application dedicated to performing cross-modal searching and providing cross-modal search results. In some examples, a user device 104 may communicate with the search system 102 using a more general application, such as a web-browser application. The application executed by a user device 104 to communicate with the search system 102 may display a search field on a graphical user interface (GUI) in which the user may input search queries. The user may input a search query, for example, by adding text to a text field using a touchscreen or physical keyboard, a speech-to-text program, or other form of user input. The user may input a search query, for example, by uploading an image stored in memory of the user device 104.

A text query entered into a GUI on a user device 104 may include words, numbers, letters, punctuation marks, and/or symbols. In general, a query may be a request for information identification and retrieval from the search system 102. For example, a query including text may be directed to providing an image that most closely matches the text of the query (e.g., includes a scene that is most closely described by the text of the query). A query including an image may be directed to providing text that most closely describes the content of the image.

A user device 104 may receive a search result from the search system 102 that is responsive to the search query transmitted to the search system 102. In various implementations, the user device 104 may receive and the search system 102 may transmit multiple search results that are responsive to the search query. In the example of the search system 102 providing multiple search results, the search system 102 may determine a confidence value (indicative of a likelihood of a search result is the most relevant search result to the search query) for each of the search results and provide the confidence values along with the search results to the user device 104. The user device 104 may display more than one of the multiple search results (e.g., all search results having a confidence value that is greater than a predetermined value), only the search result with the highest confidence value, the search results having the N highest confidence values (where N is an integer greater than one), etc.

The user device 104 may be running an application including a GUI that displays the search result(s) received from the search system 102. The respective confidence value(s) may also be displayed. For example, the application used to transmit the search query to the search system 102 may also present (e.g., display or speak) the received search results(s) to the user via the user device 104. As described above, the application that presents the received search result(s) to the user may be dedicated to interfacing with the search system 102 in some examples. In other examples, the application may be a more general application, such as a web-browser application.

The GUI of the application running on the user device 104 may display the search result(s) to the user in a variety of different ways, depending on what information is transmitted to the user device 104. In examples where the search results include a list of search results and associated confidence values, the search system 102 may transmit the list of search results and respective confidence values to the user device 104. In this example, the GUI may display the search result(s) and the confidence value(s) to the user as a list of possible search results.

In some examples, the search system 102, or other computing system, may transmit additional information to the user device 104 such as, but not limited to, applications and/or other information associated with the search results, the search query, or points of interest associated with the search results, etc. This additional information may be stored in a data store and transmitted by the search system 102 to the user device 104 in some examples. In examples where the user device 104 receives the additional information, the GUI may display the additional information along with the search result(s). In some examples, the GUI may display the search results as a list ordered from the top of the screen to the bottom of the screen by descending confidence value. In some examples, the search results may be displayed under the search field in which the user entered the search query.

In some examples, user devices 104 may communicate with the search system 102 via a partner computing system. The partner computing system may include a computing system of a third party that may leverage the search functionality of the search system 102. The partner computing system may belong to a company or organization other than that which operates the search system 102. Example third parties which may leverage the functionality of the search system 102 may include, but are not limited to, internet search providers and wireless communications service providers. The user devices 104 may send search queries to the search system 102 via the partner computing system. The user devices 104 may also receive search results from the search system 102 via the partner computing system. The partner computing system may provide a user interface to the user devices 104 in some examples and/or modify the user experience provided on the user devices 104.

Data regarding search results from which the search system 102 determines the search results for queries may be stored in one or more data sources 120. The data sources 120 may include a variety of different data providers. The data sources 120 may include digital distribution platforms such as, but are not limited to, online news sources, websites, social networking sites (e.g., Facebook, Twitter, etc.), databases, and/or other types of data sources.

The data sources 120 may include a plurality of images and associated captions, respectively. In other words, each image includes an associated caption. The images and the captions are stored in memory of one or more of the data sources 120.

The user devices 104, the search system 102, and the data sources 120 may be in communication with one another via the network 106. The network 106 may include various types of networks, such as a wide area network (WAN) and/or the Internet. Although the network 106 may represent a long range network (e.g., Internet or WAN), in some implementations, the network 106 may include a shorter range network, such as a local area network (LAN). In one embodiment, the network 106 uses standard communications technologies and/or protocols. Thus, the network 106 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

Examples of cross-modal search include visual question answering systems, visual common-sense reasoning systems, visual navigation systems, and other types of systems. Visual navigation systems, for example, collect images of an environment. Searches are performed to obtain information regarding the environment and/or features in the images located around the navigator (e.g., a vehicle), for example, as discussed further below.

To perform cross-modal searching (image to text or text to image), the search system 102 utilizes a similarity metric that defines relationships between objects that belong to different modalities, such as images and text. A joint embedding space represents the different modalities and computes similarities in the joint embedding space using joint embedding functions. This may be referred to as semantic embedding.

The present application involves training of the joint embedding space (the embedding functions). A training dataset includes images and associated (text) captions, respectively. One associated caption (including text) may be provided per image in the training dataset or multiple associated captions may be provided per image (e.g., one caption per region, or multiple captions per image). The training dataset may be, for example, the Flickr 30k dataset, the Flickr 30k Entities dataset, the MS Common Objects In Context (COCO) dataset, the visual genome dataset, the fashion 200k dataset, or another suitable dataset including images and associated captions. The training could involve, for example, listwise ranking loss. The Fickr30k dataset, for example, includes 5 captions associated with each image.

Figure 2:
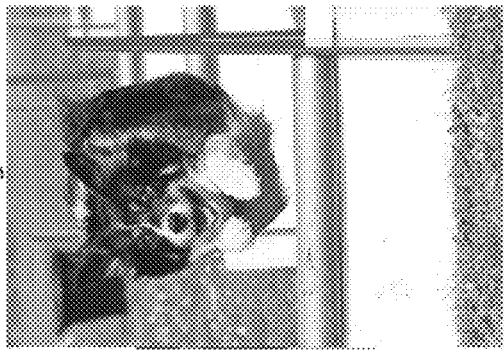
FIG. 2 includes example images and associated captions, respectively.
Figure 2:
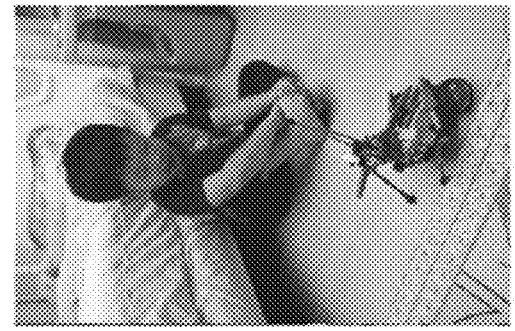
Figure 2:

The caption of one image, however, may be assumed to be non-relevant to another image. For example, FIG. 2 includes a first image (Image 1), a second image (Image 2), and a third image (Image 3). FIG. 2 also includes examples of the associated captions of the first, second, and third images directly below the first, second, and third images. For example, the caption of the first image may be "a child in orange shirt is pouring Legos out of a plastic bag". While the caption of the third image is relevant to the third image, the caption of the third image is not relevant to the first image or the second image. The caption of the second image, however, is relevant to the first image.

The present application involves providing an additional caption information to images during training so that the caption of one image will be considered more relevant to related images than non-related images. For example, an additional caption may be provided for the second image during training so that the caption of the second image will be more relevant to the first image than the third image. This example illustrates that it should not be assumed that the caption of one image is unrelated to all other images.

Figure 3:
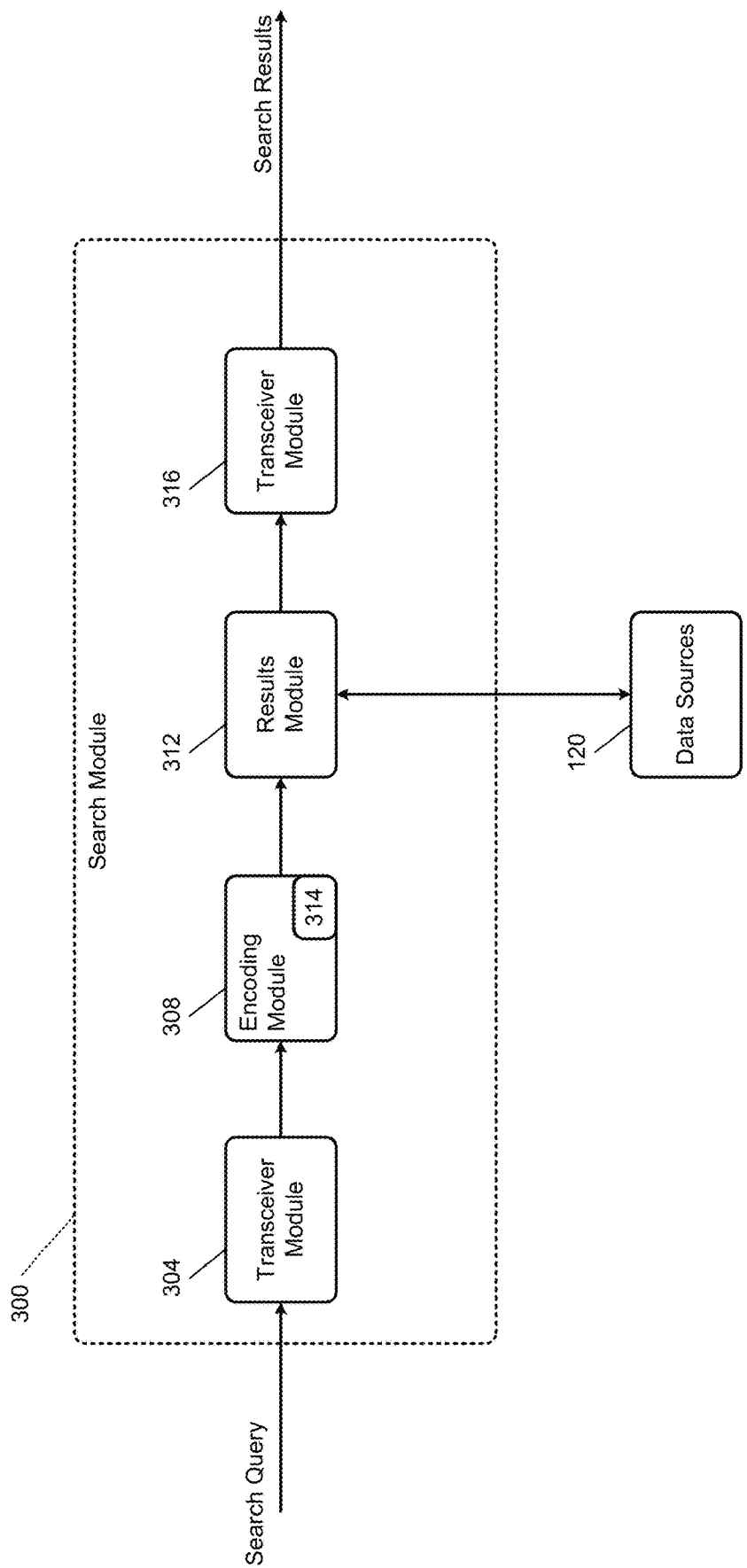
FIG. 3 includes a functional block diagram including an example implementation of a search module of the search system.

FIG. 3 is a functional block diagram including an example implementation of a search module 300 of the search system 102. A first transceiver module 304 receives a search query in a first modality regarding search results in a second modality from a user device 104. The first modality may be text and the second modality may be an image. As another example, the first modality may be an image and the second modality may be text.

An encoding module 308 encodes the search query using one or more embedding functions 314. The embedding functions 314 include an embedding function (ϕ) that encodes images and an embedding function (θ) that encodes text. The outputs of the embedding functions (ϕ) and (θ) are in the same domain as to be relatable after the encoding. The encoding module 308 encodes the search query with the appropriate one of the embedding functions 314 given the modality of the search query received. For example, if the search query includes text, the encoding module 308 encodes the search query using the embedding function (θ) that encodes text. If the search query includes an image, the encoding module 308 encodes the search query using the embedding function (ϕ) that encodes images.

A results module 312 determines search results for the search query based on the encoded output of the encoding module 308. The results module 312 determines the search results from the data sources 120 including images and associated captions (of text). The images and the captions may be encoded using the same embedding space, and the encodings may be stored in the data sources 120 or in another location. The results module 312 may determine the search results for the search query as the N entries of the data sources 120 having N stored encodings that most closely match the encoded output of the encoding module 308, where N is an integer greater than or equal to 1. Training of the embedding functions 314 is discussed further below. In various implementations, the data sources 120 may be stored within the search module 300 or within the same device as the search module 300.

A second transceiver module 316 transmits the determined search results for the search query back to the user device 104 via the network 106. In various implementations, the second transceiver module 316 may be omitted, and the first transceiver module 304 may transmit the search results back to the user device 104 from which the search query was received. The search results include data in the second modality. For example, in the example of the search query including text, the search results include N images. In the example of the search query including an image, the search results include N passages of text. In various implementations, such as in the example of a navigating robot, the first and second transceivers 304 and 316 may be omitted.

Figure 4:
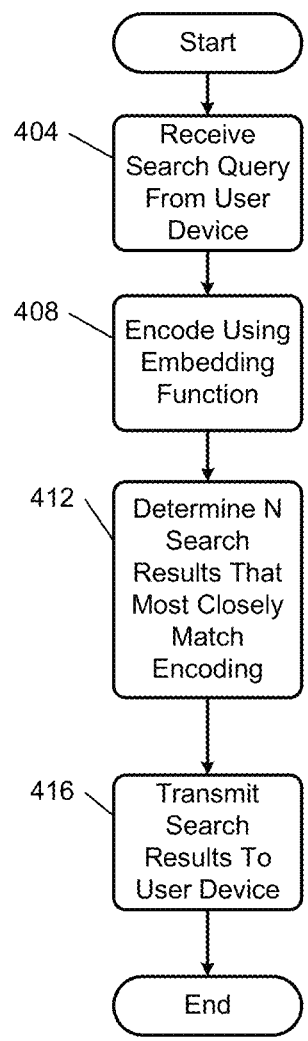
FIG. 4 includes a flowchart depicting an example method of receiving a search query and providing a response to the search query.

FIG. 4 includes a flowchart depicting an example method of receiving a search query in a first modality and providing search results in a second modality. The example of FIG. 4 may be performed by the search module 300.

Control begins with 404 where the search module 300 receives a search query, such as from a user device 104. The search query includes data in a first modality. The first modality may be, for example, text or an image.

At 408, the search module 300 encodes the search query using one of the embedding functions 314. For example, in the example of the search query including text, the search module 300 encodes the search query using the embedding function that encodes text (θ). In the example of the search query including an image, the search module 300 encodes the search query using the embedding function (ϕ) that encodes images.

At 412, the search module 300 determines the N entries of the data sources 120 with encodings that most closely match the encoding resulting from the search query. Each entry includes an image or an associated caption (of text descriptive of the image). Each entry may also include an image encoding resulting from encoding of the image of that entry using the embedding function (ϕ) that encodes images. Each entry may also include a text encoding resulting from encoding of the caption associated with the image of that entry using the embedding function (θ) that encodes text. The search module 300 may determine the N entries having text or image encodings that most closely match the encoding of the search query by comparing the encoding of the search query with the image and text encodings of the entries and identifying the N ones of the entries with at least one of text and image encodings that most closely match the encoding of the search query. N is an integer greater than or equal to 1.

At 416, the search module 300 transmits the search results to the user device 104 that transmitted the search query 416. The search results include the second modality of the N entries identified. In the example of the search query including text, the search results include the N images of the N entries identified, respectively. In the example of the search query including an image, the search results include the N captions of the N entries identified, respectively.

Figure 5:
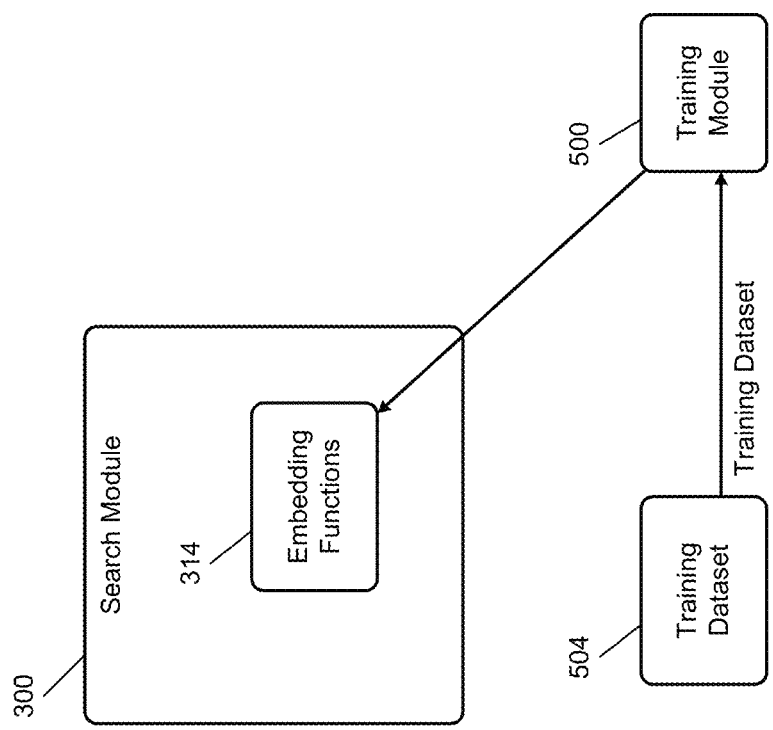
FIG. 5 includes a functional block diagram of a training system for training embedding functions used by the search system to determine responses for search queries.

FIG. 5 includes a functional block diagram of a training module 500 configured to train the embedding functions 314. The training module 500 may train the embedding functions 314, for example, using triplet losses, listwise losses, losses based on quantized mean average precision (mAP), quantized normalized discounted cumulative gain (NDCG), or another suitable form of training.

The training module 500 trains the embedding functions 314 using a training dataset 504 stored in memory. Once trained, the training module 500 stores the embedding functions 314 in the search module 300. The training dataset 504 may include, for example, the Flickr 30k dataset, the Flickr 30k Entities dataset, the MS COCO dataset, the visual genome dataset, the fashion 200k dataset, or another suitable dataset including images and associated captions.

Triplet Losses

Let $$\mathcal{D} = \{I_i, (T_i^j)_{1 \le j \le t_i}\}_{1 \le i \le N}$$

denote a dataset of N images, where each image $I_i$ is associated to a set of $t_i$ text captions $T_i^j$. The two different embedding functions ϕ and θ respectively encode images and captions (text) in a joint D-dimensional space=$R^D$ with Euclidean distance function d. Given a training dataset B⊂D of images and associated captions from the training dataset 504, the training module 500 determines similarity (or relevance) values representing similarities between pairs of entries (images and associated caption(s)) of the training dataset 504. The similarity values of two entries represents a measure of relevance of the two entries to each other.

$R_{vt}$, $R_{tv}$, $R_{vv}$ and $R_{tt}$ are matrices that respectively define image-to-caption, caption-to-image, image-to-image, and caption-to-caption relevance matrices. The training module 500 may construct the relevance matrices $R_{vt}$, $R_{tv}$, $R_{vv}$ and $R_{tt}$ based on the similarities between pairs of entries and is discussed further below. The training module 500 trains the embedding functions 314 in an effort to represent text and images indistinguishably from one another so that encoding of an image ($I_i$) is as close as possible to encoding of the caption ($T_i$) associated with the image ($I_i$). Additionally, the training module 500 trains the embedding functions such that similar images are encoded as closely as possible to each other and two similar captions are encoded as closely as possible to each other.

The training module 500 may jointly train the embedding functions ϕ and θ using a learning to rank algorithm and the following four losses including two cross-modal losses and two in-modal losses. The two cross-modal losses ensure that the encoding of a query in a first modality and a relevant item for that query from a second (different) modality are closer than the encodings of the query and a non-relevant item.

The two cross-modal losses include $L_{v,t}(\Phi,\Theta)$ and $L_{t,v}(\Phi,\Theta)$ and can be described as follows.

$$L_{v,t}(\Phi,\Theta)=\Sigma_{T_{v,t}}\max(0,\gamma+d(\Phi(I_i),\Theta(T_j))-d(\Phi(I_i),\Theta(T_k))), \quad (1)$$

where $$T_{v,t}=\{(I_i,T_j,T_k)\in \mathcal{B} \mid \hat{R}_{vt}(i,j)=1, \hat{R}_{vt}(i,k)=0\} \quad (1)$$

$$L_{t,v}(\Phi,\Theta)=\Sigma_{T_{t,v}}\max(0,\gamma+d(\Phi(I_j),\Theta(T_i))-d(\Phi(I_k),\Theta(T_i))), \quad (2)$$

where $$T_{t,v}=\{(T_i,I_j,I_k)\in \mathcal{B} \mid \hat{R}_{tv}(i,j)=1, \hat{R}_{tv}(i,k)=0\} \quad (2)$$

where γ is a constant value.

Equation (2) above encourages that, given an image $I_i$, a distance to a relevant caption $T_j$ (j may be equal to or different than i) should be smaller than a distance to a non-relevant caption $T_k$. The image to text relevance is defined by matrix Rut. Equation (2) encourages a symmetric case where the roles of images and captions are reversed. For example, equation (2) encourages that, given a caption $T_i$, its distance to a relevant image $I_j$ (j may be equal to or different than i) should be smaller than the distance to a non-relevant image $I_k$.

The two within-modal losses include $L_{v,v}(\Phi,\Theta)$ and $L_{t,t}(\Phi,\Theta)$ and can be described as follows.

$$L_{v,v}(\Phi,\Theta)=\Sigma_{T_{v,v}}\max(0,\gamma+d(\Phi(I_i),\Theta(T_j))-d(\Phi(I_i),\Phi(I_k))), \quad (3)$$

where $$T_{v,v}=\{(I_i,I_j,I_k)\in \mathcal{B} \mid \hat{R}_{vv}(i,j)=1, \hat{R}_{vv}(i,k)=0\} \quad (3)$$

$$L_{t,t}(\Phi,\Theta)=\Sigma_{T_{t,t}}\max(0,\gamma+d(\Theta(T_i),\Theta(T_j))-d(\Theta(T_i),\Theta(T_k))), \quad (4)$$

where $$T_{tt}=\{(I_i,I_j,I_k)\in \mathcal{B} \mid \hat{R}_{tt}(i,j)=1, \hat{R}_{tt}(i,k)=0\} \quad (4)$$

where γ is a constant value.

Equation (3) preserves the structure of the visual representations (images) in the embedding space Ω. Equation (4) preserves the structure of the textual representations (captions) in the embedding space Ω.

The training module 500 determines a final loss value for learning the parameters of ϕ and θ based on the cross-modal losses and the within-modal losses. The training module 500 may determine the final loss value, for example, using one of a lookup table and an equation that relates the cross-modal losses and the within-modal losses to final loss values. For example, the training module 500 may determine the final loss value (L) using the equation:

$$L=\lambda_{v,v}L_{v,v}+\lambda_{v,t}L_{v,t}+\lambda_{t,v}L_{t,v}+\lambda_{t,t}L_{t,t},$$

where $\lambda_{v,v}, \lambda_{v,t}, \lambda_{t,v}$, and $\lambda_{t,t}$ include weights for the losses. The training module 500 may sum the final loss value over all triplets extracted from the batch B.

The cross-modal losses and the within-modal losses are triplet losses in that each term within the losses considers three samples: a query item, a relevant item, and a non-relevant item. The matrices $R_{vt}$, $R_{tv}$, $R_{vv}$ and $R_{tt}$ define ground-truth annotations of the relevance relationship between items of the same or different modalities. The training module 500 creates the matrices $R_{vt}$, $R_{tv}$, $R_{vv}$ and $R_{tt}$ by assuming that the image $I_i$ is only relevant for its $t_i$ captions ($T_i^j$) and vice-versa. The matrices $R_{vt}$, $R_{tv}$, $R_{vv}$ and $R_{tt}$ are therefore sparse and are defined as follows.

$$R_{vv} = I_N$$

$$R_{vt} = \begin{bmatrix} 1...1 & 0...0 & 0...0 & 0...0 \\ 0...0 & 1...1 & 0...0 & 0...0 \\ \vdots & 0...0 & \ddots & \vdots \\ 0...0 & 0...0 & ... & 1...1 \end{bmatrix}$$

$$R_{tv} = R_{vt}^T$$

$$R_{vt} = \begin{bmatrix} I_{t1} & 0 & 0 & 0 \\ 0 & I_{t2} & 0 & 0 \\ \vdots & 0 & \ddots & \vdots \\ 0 & 0 & ... & I_{tN} \end{bmatrix}$$

$I_N$ represents the identity matrix. T represents the transpose. $I_t$ may be replaced with 1 . . . 1 and 0 may be replaced with 0 . . . 0 in the matrix $R_{vt}$.

The training module 500 trains and extends the matrices $R_{vt}$, $R_{tv}$, $R_{vv}$ and $R_{tt}$ to produce the matrices $\hat{R}_{vv}$, $\hat{R}_{tv}$, $\hat{R}_{vt}$, and $\hat{R}_{tt}$, used above in the cross-modal losses and the within-modal losses. More specifically, the training module 500 adds additional annotations (text/caption) to the matrices $R_{vt}$, $R_{tv}$, $R_{vv}$, and $R_{tt}$ to produce the matrices $\hat{R}_{vv}$, $\hat{R}_{tv}$, $\hat{R}_{vt}$, and $\hat{R}_{tt}$. The training module 500 determines the additional notations based on the semantic nature of the description of the images provided in the captions. The textual descriptions of the associated images provided in their captions provide a good semantic description of a visual scene of an image. The similarity between two captions associated with two different images is therefore representative of the semantic similarity between the two images described by the two captions. The similarities are preserved in the joint embedding space for the first and second modalities.

Start with a text representation f (a function) that captures as much semantic information as possible. The implication is that $d(f(T_i),f(T_j))$ is a good proxy of the (ground truth) similarity between the captions $T_i$ and $T_j$. Function f is also extended to represent images as well as captions. An image $I_i$ can be described as an average of the text representations of its $t_i$ captions, $$f(I_i) = \frac{1}{t_i} \sum_{j \in t_i} f(T_j).$$

The above allows the training module 500 to extend the matrices $R_{vt}$, $R_{tv}$, $R_{vv}$, and $R_{tt}$ to produce the matrices $\hat{R}_{vv}$, $\hat{R}_{tv}$, $\hat{R}_{vt}$, and $\hat{R}_{tt}$. The training module 500 generates the entries of matrices $\hat{R}_{vv}$, $\hat{R}_{tv}$, $\hat{R}_{vt}$, and $\hat{R}_{tt}$ as follows.

$\hat{R}_{vv}(i,j)=1$ if $i=j$ OR $d(f(I_i),f(I_j))>\tau$ $\hat{R}_{vt}(i,j)=1$ if $R_{vt}=1$ OR $d(f(I_i),f(T_j))>\tau$ $\hat{R}_{tv}(i,j)=1$ if $R_{tv}=1$ OR $d(f(T_i),f(I_j))>\tau$ $\hat{R}_{tt}(i,j)=1$ if $R_{tt}=1$ OR $d(f(T_i),f(T_j))>\tau$ Else the training module 500 sets the entries of $\hat{R}_{vv}$, $\hat{R}_{tv}$, $\hat{R}_{vt}$, and $\hat{R}_{tt}$ to 0. $\tau$ is a predetermined threshold value and is discussed further below.

Matrices $\hat{R}_{vv}$, $\hat{R}_{tv}$, $\hat{R}_{vt}$, and $\hat{R}_{tt}$ are therefore more complete and inclusive than matrices $R_{vt}$, $R_{tv}$, $R_{vv}$, and $R_{tt}$. The matrices $\hat{R}_{vv}$, $\hat{R}_{tv}$, $\hat{R}_{vt}$, and $\hat{R}_{tt}$ encourage that the ranking produced by the similarities obtained from the captions is preserved after embedding images and captions with the embedding functions $\phi$ and $\theta$. Thus, using the example of FIG. 2, the first image will be more closely related to the second image than the third image. The second image will also be more closely related to the first image than the third image.

Based on the bag-of-words representation of the captions, a term frequency-inverse document frequency (TF-IDF) representation applies a weighting scheme to reflect how important a word in a caption is to the caption by down-weighting the importance of common terms and increasing the importance of rare words. In the above, text descriptors f was used based on the TF-IDF representation, but other representations could be used, such as a bidirectional encoder representation from transformers (BERT) representation or another suitable representation.

Listwise Losses

Use of triplet losses in determining the cross-modal losses and the within-modal losses is discussed above. However, the training module 500 may alternatively determine the cross-modal losses and the within-modal losses using listwise losses. Listwise losses involve use of histogram approximations to mean average precision (mAP) and consider a R number of items (images or text) at the same time while jointly optimizing their rankings. R is an integer greater than three.

When using listwise losses, the training module 500 determines the final loss values as discussed above. The matrices $\hat{R}_{vv}$, $\hat{R}_{tv}$, $\hat{R}_{vt}$, and $\hat{R}_{tt}$ are also used and built as described above. Each term in the cross-modal losses and the within-modal losses, however, is determined based on a batch of more than three items, as opposed to the three items considered above using triplet losses.

Figure 6A:
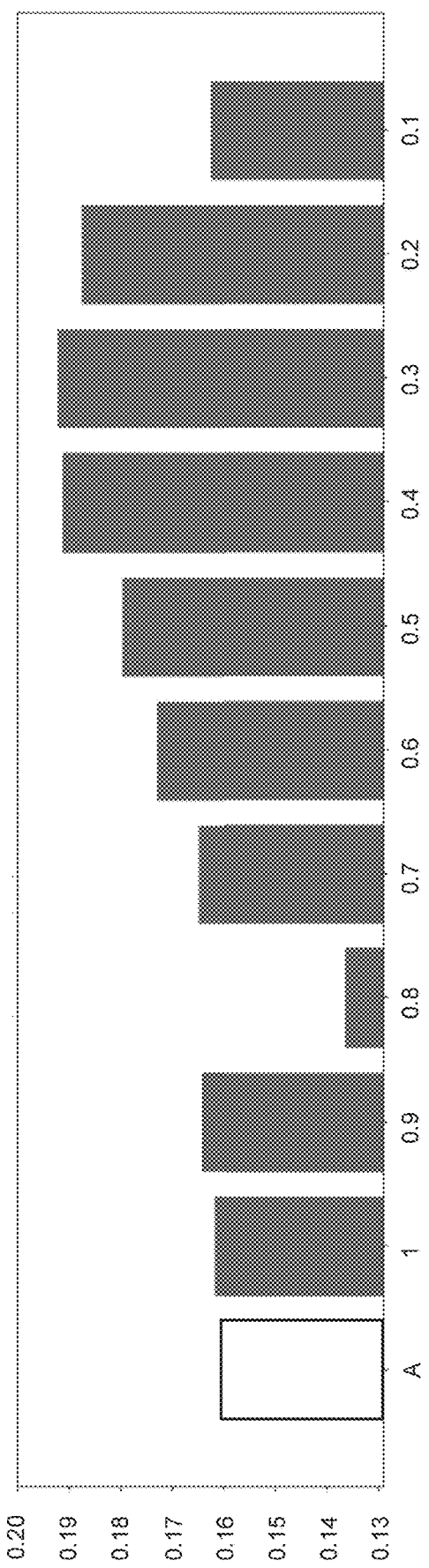
FIGS. 6A and 6B include graphs of scores for top 1 results produced using a baseline training and annotated training for text to image retrieval and image to text retrieval.

FIG. 6A is an example graph of scores for top1 results produced using a baseline training (involving the use of matrices $R_{vt}$, $R_{tv}$, $R_{vv}$, and $R_{tt}$) and the annotated training discussed above (involving use of the matrices $\hat{R}_{vv}$, $\hat{R}_{tv}$, $\hat{R}_{vt}$, and $\hat{R}_{tt}$) for text to image retrieval. The baseline training is illustrated by column A. The annotated training (involving use of the matrices $\hat{R}_{vv}$, $\hat{R}_{tv}$, $\hat{R}_{vt}$, and $\hat{R}_{tt}$) is provided in columns based on the threshold ($\tau$) used to generate the matrices $\hat{R}_{vv}$, $\hat{R}_{tv}$, $\hat{R}_{vt}$, and $\hat{R}_{tt}$ from the matrices $R_{vt}$, $R_{tv}$, $R_{vv}$ and $R_{tt}$.

Figure 6B:
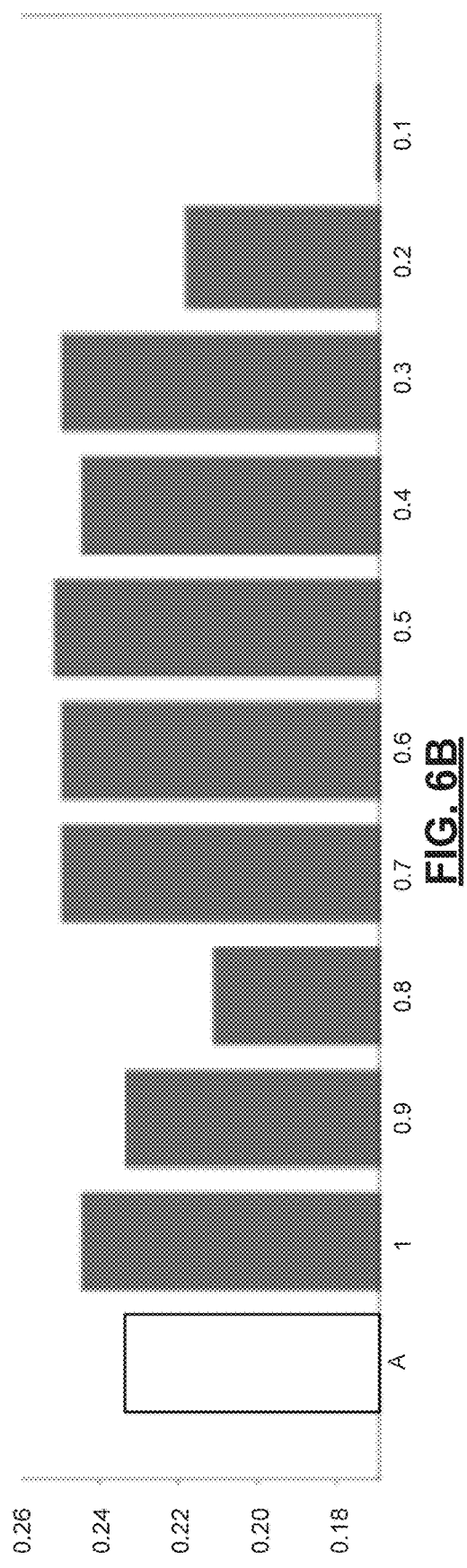

FIG. 6B is an example graph of scores for top1 results produced using a baseline training (involving the use of matrices $R_{vt}$, $R_{tv}$, $R_{vv}$ and $R_{tt}$) and the annotated training discussed above (involving use of the matrices $\hat{R}_{vv}$, $\hat{R}_{tv}$, $\hat{R}_{vt}$, and $\hat{R}_{tt}$) for image to text retrieval. The baseline training is illustrated by column A. The annotated training (involving use of the matrices $\hat{R}_{vv}$, $\hat{R}_{tv}$, $\hat{R}_{vt}$, and $\hat{R}_{tt}$) is provided in columns based on the threshold ($\tau$) value used to generate the matrices $\hat{R}_{vv}$, $\hat{R}_{tv}$, $\hat{R}_{vt}$, and $\hat{R}_{tt}$ from the matrices $R_{vt}$, $R_{tv}$, $R_{vv}$ and $R_{tt}$.

As illustrated by FIGS. 6A and 6B, the threshold ($\tau$) value used varies the score of the search results retrieved given a query.

Below is a Table illustrating scores of example top-k results and mAP for different resolution images (low—224× 224 pixels and high—800×800 pixels) using the baseline training (Baseline) and the annotated training (Annotated) where the matrices $\hat{R}_{vv}$, $\hat{R}_{tv}$, $\hat{R}_{vt}$, and $\hat{R}_{tt}$ were generated using a threshold ($\tau$) value of 0.5. mAP based losses are briefly discussed above and are additionally discussed further below.

|  | | text-to-image | | | | image-to-text | | | |
|---|---|---|---|---|---|---|---|---|---|
|  | Resolution | mAP | top-1 | top-5 | top-20 | mAP | top-1 | top-5 | top-20 |
| Baseline | 224 | 0.264 | 0.165 | 0.369 | 0.576 | 0.195 | 0.242 | 0.494 | 0.717 |
| Annotated | 224 | 0.293 | 0.188 | 0.410 | 0.609 | 0.204 | 0.251 | 0.504 | 0.707 |
| Baseline | 800 | 0.321 | 0.205 | 0.450 | 0.655 | 0.248 | 0.313 | 0.597 | 0.797 |
| Annotated | 800 | 0.368 | 0.243 | 0.513 | 0.705 | 0.284 | 0.362 | 0.653 | 0.842 |

Other Losses

As another example, the training module 500 may determine the final loss value (L) using the equation:

$$L(\Phi,\Theta)=\lambda_{vt}L_{vt}(S_{vt}(\Phi,\Theta)),\hat{R}_{vt})+\lambda_{tv}L_{tv}(S_{tv}(\Phi,\Theta)),\hat{R}_{tv})+\lambda_{tt}L_{tt}(S_{tt}(\Phi,\Theta)),\hat{R}_{tt})+\lambda_{vv}L_{vv}(S_{vv}(\Phi,\Theta)),\hat{R}_{vv}),$$

where $\lambda_{vv},\lambda_{vt},\lambda_{tv}$, and $\lambda_{tt}$ include weights for the losses. The training module 500 may sum the final loss value over all triplets extracted from the batch B. Alternatively, listwise losses can be used to determine the cross-modal losses and the within-modal losses.

As used above, $S_{vt}$, $S_{tv}$, $S_{vv}$, and $S_{tt}$ are (similarity) matrices that include pairwise distances between representations of images and associated captions, captions and images, images and images, and captions and captions, respectively. $S_{vt}$, $S_{tv}$, $S_{vv}$, and $S_{tt}$ are as follows.

$$S_{vt}(\Phi,\Theta)=\{d(\Phi(I_i),\Theta(T_j))\}_{I_i,T_j \in \mathcal{B}}$$

$S_{tv}(\Phi,\Theta) = \{d(\Phi(T_j),\Theta(I_i))\}_{I_i,T_j \in} \mathcal{B}$ $S_{tt}(\Phi,\Theta) = \{d(\Phi(T_i),\Theta(T_j))\}_{T_i,T_j \in} \mathcal{B}$ $S_{vv}(\Phi,\Theta) = \{d(\Phi(I_i),\Theta(I_j))\}_{I_i,I_j \in} \mathcal{B}$ Listwise losses are an alternative to triplet losses and optimize a ranking measure across all items of a batch. For each query, the training module 500 splits the embedding space $\Omega$ into bins. Each bin corresponds to a predetermined range of distances from the query. The ranking of the bins with respect to the distances is fixed. The training module 500 approximates a ranking measure (e.g., mAP, normalized discounted cumulative gain (NDCG)) based on the number of counts in each bin. The training module 500 assigns samples to one or more bins using a kernel function.

For example, the training module 500 spits an interval [0,1] of possible distances (using normalized representation vectors) into M bins having equal sizes (distance ranges). For $m \in \{1, 2, \ldots, M\}$, let $\delta_m: [0,1] \rightarrow [0,1]$ denote the function that assigns each distance to the bin m through a triangular kernel function. The binning function $\delta = \{\delta_m\}_{1 \leq m \leq M}$ is such that $$\forall d \in [0,1], \Sigma_{m=1}^{M} \delta_m(d) = 1.$$

Consider one query indexed by q ($I_q$ if image to text or image to image, $T_q$ if text to image or text to text) from the set of all possible queries $\hat{\mathcal{B}}$ in $\mathcal{B}$. $\mathcal{B}_q$ is a subset of $\mathcal{B}$ that can be retrieved by q (e.g., all images of $\mathcal{B}$ for a text to image search).

For the query index q and a given bin m, $c_{q,m}$ is the count of bin m after assignment, and $C_{q,m}$ is the cumulative sum of all of the bins before m. If S is the similarity matrix ($S_{vt}$, $S_{tv}$, $S_{vv}$, and $S_{tt}$ discussed above), $c_{q,m} = \Sigma_{i \in} \mathcal{B}_q \delta_m(S(q,i)), C_{q,m} = \Sigma_{m'=1}^{m} c_{q,m'}.$ The above involves binary relevance annotations including either a 1 for relevant items or a 0 for non-relevant items.

The training module 500 trains the embedding functions 314 based on the content $c_{q,m}$ of each bin and the count of relevant samples of the bins ($c^+$). The training module 500 defines, only for relevant samples, $c_{q,m}^+$ and $C_{q,m}^+$.

$$c_{q,m}^+ = \sum_{i \in \mathcal{B}_q} R(q,i) \delta_m(S(q,i)), \quad C_{q,m}^+ = \sum_{m'=1}^{m} c_{q,m'}^+$$

Based on these variables, the training module 500 determines a quantized Average Precision for the query q by calculating the precision and recall at each bin. The training module 500 determines the quantized mean Average Precision ($mAP_Q$) by summing the quantized Average Precision over all of the possible queries q.

$$mAP_Q(S,R) = \frac{1}{|\mathcal{B}|} \sum_{q \in \hat{\mathcal{B}}} \sum_{m=1}^{M} \frac{c_{q,m}^+ C_{q,m}^+}{C_{q,m} C_{q,M}}$$

The training module 500 determines the cross-modal losses and within modal-losses based on the quantized mAP, such as follows.

$L_{vt}(S_{vt}(\Phi,\Theta),R_{vt}) = mAP_Q(S_{vt},R_{vt})$ $L_{tv}(S_{tv}(\Phi,\Theta),R_{tv}) = mAP_Q(S_{tv},R_{tv})$ $L_{tt}(S_{tt}(\Phi,\Theta),R_{tt}) = mAP_Q(S_{tt},R_{tt})$ $L_{vv}(S_{vv}(\Phi,\Theta),R_{vv}) = mAP_Q(S_{vv},R_{vv})$ Based on these loss values, the training module 500 may determine the final loss value (L) using the equation:

$L = \lambda_{vt} mAP_Q(S_{vt},R_{vt}) + \lambda_{tv} mAP_Q(S_{tv},R_{tv}) + \lambda_{tt} mAP_Q(S_{tt},R_{tt}) + \lambda_{vv} mAP_Q(S_{vv},R_{vv}),$ where $\lambda_{vv}, \lambda_{vt}, \lambda_{tv}$, and $\lambda_{tt}$ include weights for the losses. The training module 500 may sum the final loss value over all sets extracted from the batch B.

The above, however, may or may not enable the use of the non-binary relevance matrices.

The training module 500 may therefore determine the cross-modal losses and the within-modal losses based on a normalized discounted cumulative gain (NDGC) measure. N is a set of possible values defining the relevance between two items (objects), such as an image and a caption. Other loss functions may demand that N={0,1} meaning that N may be limited to 0 or 1 for other loss functions. According to the present application, however, N can be 0, 1, or another value between 0 and 1. Because the dataset is finite, the set of relevance values L is also finite and corresponds to, for a given batch $\mathcal{B}$, $N_Q = \{R(q,i) | i \in \mathcal{B}_q\},$ where R is a pairwise relevance matrix and q is the index of the query that defines the batch subset $\mathcal{B}_q$.

With $N_q$ defined as above, for each r in $N_q$, $C_{q,m}^r$ is the count at bin m and can be determined by the training module 500 as follows $$c_{q,m}^r = \sum_{i \in \mathcal{B}_q} \delta_m(S(q,i)) 1\!1[S(q,i) = r]$$

The above is used to define a quantized NDCG loss, or $NDCG_Q$ which depends on relevance matrix R and a similarity matrix S as follows.

$$NDCG_Q(S,R) = \frac{1}{|\mathcal{B}|} \sum_{q \in \hat{\mathcal{B}}} \sum_{m=1}^{M} \frac{\sum_{rel}(2^r - 1) c_{q,m}^r}{log_2\left(C_{Q,m-1} + \frac{1}{2} c_{q,m} + \frac{3}{2}\right)}$$

The training module 500 uses the above quantized NDCG loss to determine the cross-modal losses and the within-modal losses, such as follows.

$L_{vt}(S_{vt}(\Phi,\Theta),R_{vt}) = NDCG_Q(S_{vt},R_{vt})$ $L_{tv}(S_{tv}(\Phi,\Theta),R_{tv}) = NDCG_Q(S_{tv},R_{tv})$ $L_{tt}(S_{tt}(\Phi,\Theta),R_{tt}) = NDCG_Q(S_{tt},R_{tt})$ $L_{vv}(S_{vv}(\Phi,\Theta),R_{vv}) = NDCG_Q(S_{vv},R_{vv})$ Based on these loss values, the training module 500 may determine the final loss value (L) using the equation:

$L = \lambda_{vt} NDCG_Q(S_{vt},R_{vt}) + \lambda_{tv} NDCG_Q(S_{tv},R_{tv}) + \lambda_{tt} NDCG_Q(S_{tt},R_{tt}) + \lambda_{vv} NDCG_Q(S_{vv},R_{vv}),$ where $\lambda_{vv}, \lambda_{vt}, \lambda_{tv}$, and $\lambda_{tt}$ include weights for the losses. The training module 500 may sum the final loss value over all sets extracted from the batch B.

The training module 500 trains the embedding functions $\Phi$, $\Theta$ to obtain the embedding space $\Omega$ using the final loss and multimodal data from the training dataset 504. The training module 500 ranks all of the items of one modality with respect to a query from another modality by comparing distances in the embedding space using the embedding functions.

Below is a Table illustrating scores of example top-k results for both image to text and text to image retrieval tasks based on the Flickr30k dataset. The first and second rows involve using mAP, as described above. The baseline involves use of the baseline training (Baseline) involving the matrices, and extended binary involves use of the extended relevance matrices $\hat{R}_{vv}$, $\hat{R}_{tv}$, $\hat{R}_{vt}$, and $\hat{R}_{tt}$. The third and fourth rows involve use of the NDCG loss, as discussed above.

| Loss | Labels | text-to-image | | | | image-to-text | | | |
|------|--------|-----|-----|-----|------|-----|-----|-----|------|
|      |        | mAP | top-1 | top-5 | top-20 | mAP | top-1 | top-5 | top-20 |
| mAP  | binary | 0.264 | 0.165 | 0.369 | 0.576 | 0.195 | 0.242 | 0.494 | 0.717 |
| mAP  | Binary with annotations | 0.293 | 0.188 | 0.410 | 0.609 | 0.204 | 0.251 | 0.504 | 0.707 |
| NDCG | Binary with annotations | 0.303 | 0.196 | 0.417 | 0.635 | 0.199 | 0.245 | 0.517 | 0.742 |
| NDCG | continuous (non-binary) labels | 0.328 | 0.204 | 0.449 | 0.669 | 0.217 | 0.272 | 0.550 | 0.756 |

One example of cross-modal retrieval is in the realm of visual navigation by a vehicle where images of an environment are captured and analyzed to determine text that is descriptive of objects in the environment.

Figure 7:
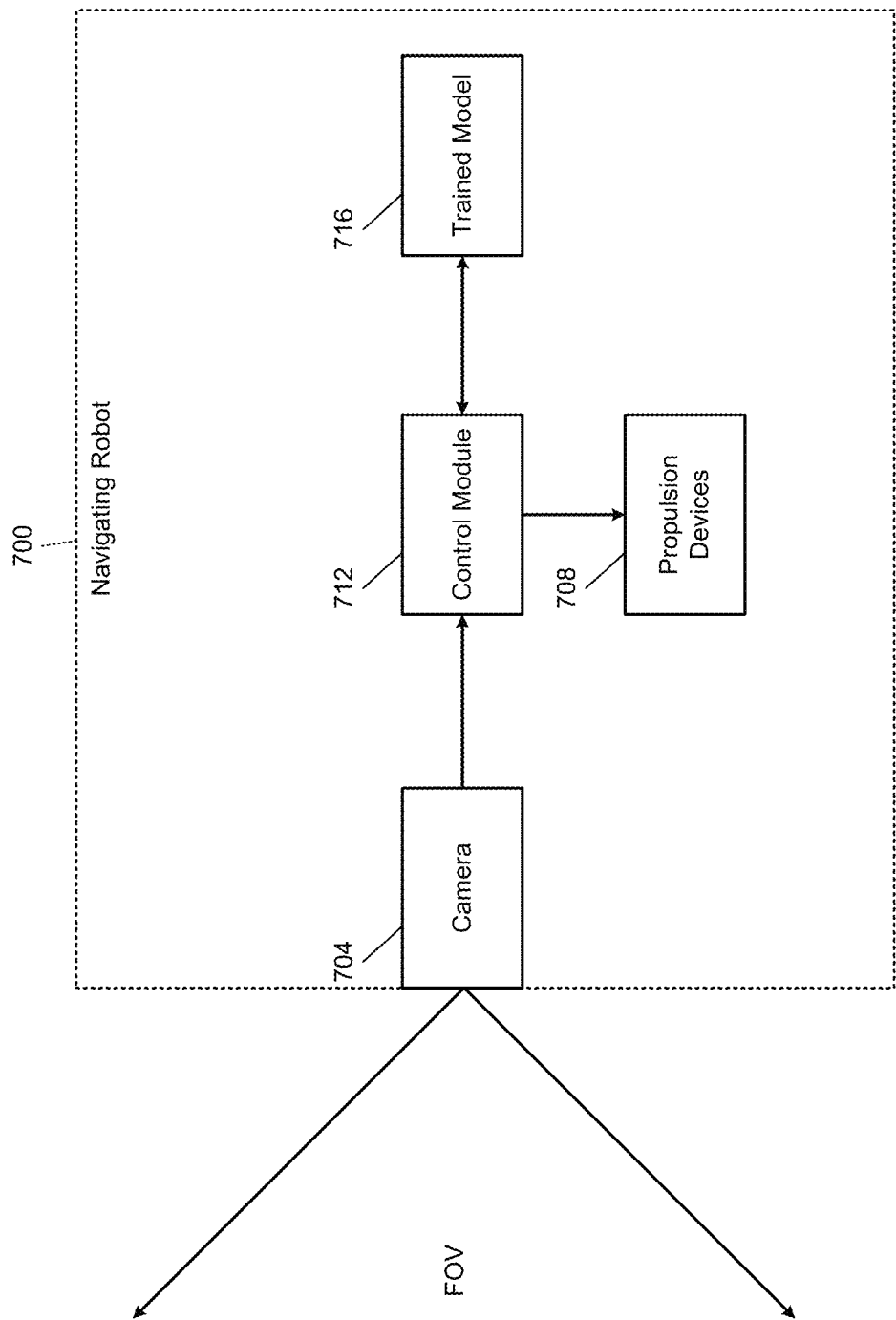
FIG. 7 is a functional block diagram of an example implementation of a navigating robot.

FIG. 7 is a functional block diagram of an example implementation of a navigating robot 700. The navigating robot 700 includes a camera 704 that captures images within a predetermined field of view (FOV) in front of the navigating robot 700. The predetermined FOV may be less than or equal to 360 degrees around the navigating robot 700. The navigating robot 700 may therefore have less than or equal to a full 360 degree FOV around the navigating robot 700. The operating environment of the navigating robot 700 may be an indoor space, i.e., within a building, parking garage, cave or other enclosure, or an outdoor space.

The camera 704 may be, for example, a grayscale camera, a grayscale-D camera, a red, green, blue (RGB) camera, an RGB-D camera, or another suitable type of camera. A grayscale-D camera includes a depth (D) component. An RGB-D camera also includes a depth (D) component. In various implementations, the navigating robot 700 may include only the (one) camera 704 and not include any other visual imaging cameras and/or sensors. Alternatively, the navigating robot 700 may include one or more other cameras and/or one or more other types of sensors.

The navigating robot 700 includes one or more propulsion devices 708, such as one or more wheels, one or more treads, one or more moving legs, and/or one or more other types of devices configured to propel the navigating robot 700 forward, right, left, up and/or down. A combination of two or more of the propulsion devices 708 may be used to propel the navigating robot 700 forward, to turn the navigating robot 700 right, to turn the navigating robot 700 left, and/or to elevate the navigating robot 700 vertically up or down.

The navigating robot 700 includes a control module 712 that is configured to control the propulsion devices 708 to navigate the operating environment from a starting location to a goal location without colliding with any objects based on input from the camera 704 and using a trained model 716 including the (trained) embedding functions 314. The trained model 716 is stored in memory of the navigating robot 700. The trained model 716 includes the embedding functions for determining text including descriptions of objects in the operating environment based on images from the camera 704.

The trained model 716 may generate an output indicative of an action to be taken by the navigating robot 700 given an image from the camera 704. The camera 704 may update at a predetermined frequency, such as 60 hertz (Hz), 120 Hz, or another suitable frequency. The trained model 716 may generate an output each time the input from the camera 704 is updated. The trained model 716 may be configured to set the output at a given time to one of a group consisting of: a first state (corresponding to moving forward by a predetermined distance, such as 1 foot or ⅓ of a meter), a second state (corresponding to turning right by a predetermined angle, such as 45 or 90 degrees), a third state (corresponding to turning left by a predetermined angle, such as 45 or 90 degrees), and a fourth state (corresponding to not moving).

The control module 712 is configured to control the propulsion devices 708 based on the output of the trained model 716. For example, the control module 712 may actuate the propulsion devices 708 to move the navigating robot 700 forward by the predetermined distance in response to the output of the trained model 716 being in the first state. The control module 712 may actuate the propulsion devices 708 to turn the navigating robot 700 to the right by the predetermined angle in response to the output of the trained model 716 being in the second state. The control module 712 may actuate the propulsion devices 708 to turn the navigating robot 700 to the left by the predetermined angle in response to the output of the trained model 716 being in the third state. The control module 712 may not actuate the propulsion devices 708 to not move the navigating robot 700 in response to the output of the trained model 716 being in the fourth state.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for training a cross-modal search system, comprising:
   a training dataset including first objects of a first modality and second objects of a second modality that are associated with the first objects, respectively,
   wherein the first modality is different than the second modality, and
   wherein the second objects include text that is descriptive of the first objects;
   a first matrix including first relevance values indicative of relevance between the first objects and the second objects, respectively;

a second matrix including second relevance values indicative of relevance between the second objects and the first objects, respectively; and a training module configured to:
based on similarities between ones of the second objects, generate a third matrix by selectively adding first additional relevance values to the first matrix;

based on the similarities between the ones of the second objects, generate a fourth matrix by selectively adding second additional relevance values to the second matrix; and store the third and fourth matrices in memory of a search module for cross-modal retrieval in response to receipt of search queries.

2. The system of claim 1 further comprising:
a fifth matrix including third relevance values indicative of relevance between the first objects and the first objects, respectively; and a sixth matrix including fourth relevance values indicative of relevance between the second objects and the second objects, respectively.

3. The system of claim 1 wherein the training module is further configured to:
based on the similarities between the ones of the second objects, generate a seventh matrix by selectively adding third additional relevance values to the fifth matrix;

based on the similarities between the ones of the second objects, generate an eight matrix by selectively adding fourth additional relevance values to the sixth matrix; and store the seventh and eighth matrices in the memory of the search module for the cross-modal retrieval in response to receipt of search queries.

4. The system of claim 1 wherein the training module is configured to add a first relevance value to the first matrix when a first similarity value representative of a similarity between a first one of the second objects and a second one of the second objects is greater than a predetermined threshold value.

5. The system of claim 4 wherein the training module is configured to add a second relevance value to the second matrix when a second similarity value representative of a second similarity between a third one of the second objects and a fourth one of the second objects is greater than the predetermined threshold value.

6. The system of claim 1 wherein the first objects are one of images, sounds, and videos.

7. The system of claim 1 wherein the training module is configured to:
determine listwise losses based on the training dataset and using the third and fourth matrices;
train first and second functions for cross-modal retrieval based on the listwise losses; and
store the first and second functions in the memory of the search module.

8. The system of claim 1 wherein the training module is configured to:
determine triplet losses based on triplets of the training dataset and using the third and fourth matrices;
train first and second functions for cross-modal retrieval based on the triplet losses; and
store the first and second functions in the memory of the search module.

9. The system of claim 1 wherein the training module is configured to:

determine the quantized mean average precision (mAP) losses based on the training dataset and using the third and fourth matrices;
train first and second functions for cross-modal retrieval based on the quantized mAP losses; and
store the first and second functions in the memory of the search module.

10. The system of claim 1 wherein the training module is configured to:
determine the quantized normalized discounted cumulative gain (NDCG) losses based on the training dataset and using the third and fourth matrices;
train first and second functions for cross-modal retrieval based on the quantized NDCG losses; and
store the first and second functions in the memory of the search module.

11. The system of claim 1 wherein the third and fourth matrices include values selected from a group consisting of 0 and 1.

12. The system of claim 1 wherein the third and fourth matrices include values selected from a group consisting of 0, 1, and values between 0 and 1.

13. A method for cross-modal search, comprising:
receiving, at a search module, a first search query in a first modality;
accessing a third matrix and fourth matrix in memory of the search module in response to the first search query;
encoding the first search query using a first function including the third and fourth matrices;
identifying at least one search result for the first search query based on a result of the encoding using the first function; and
transmitting the at least one search result from the search module;
wherein the third and fourth matrices are generated by:
accessing a training dataset including first objects of the first modality and second objects of a second modality that are associated with the first objects, respectively, the first modality being different than the second modality, and the second objects including text that is descriptive of the first objects;
obtaining a first matrix including first relevance values indicative of relevance between the first objects and the second objects, respectively;
obtaining a second matrix including second relevance values indicative of relevance between the second objects and the first objects, respectively;
based on similarities between ones of the second objects, generating the third matrix by selectively adding first additional relevance values to the first matrix; and
based on the similarities between the ones of the second objects, generating the fourth matrix by selectively adding second additional relevance values to the second matrix.

14. The method of claim 13 further comprising, by the search module:
receiving a second search query in the second modality;
encoding the second search query using a second function including the third and fourth matrices; and
identifying at least one search result for the second search query based on a result of the encoding using the second function.

15. The method of claim 14 further comprising:
receiving the first search query from a user device over a network; and transmitting the at least one search result for the first search query to the user device over the network.

* * * * *